US012220978B2

(12) United States Patent
Yaita et al.

(10) Patent No.: US 12,220,978 B2
(45) Date of Patent: Feb. 11, 2025

(54) VEHICLE BODY STRUCTURE

(71) Applicant: HONDA MOTOR CO., LTD., Tokyo (JP)

(72) Inventors: Satoshi Yaita, Wako (JP); Ken Yasui, Wako (JP); Yu Iemura, Wako (JP); Satoru Kawabe, Wako (JP); Masaaki Tatsuwaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 523 days.

(21) Appl. No.: 17/590,845

(22) Filed: Feb. 2, 2022

(65) Prior Publication Data

US 2022/0258585 A1 Aug. 18, 2022

(30) Foreign Application Priority Data

Feb. 15, 2021 (JP) .................................. 2021-021808

(51) Int. Cl.
*B62D 21/15* (2006.01)
*B60K 1/04* (2019.01)
(Continued)

(52) U.S. Cl.
CPC ................ *B60K 1/04* (2013.01); *B62D 21/15* (2013.01); *H01M 50/244* (2021.01);
(Continued)

(58) Field of Classification Search
CPC ........................... B62D 21/157; B62D 25/2036
See application file for complete search history.

(56) References Cited

U.S. PATENT DOCUMENTS 10,913,340 B2 * 2/2021 Tsuyuzaki ................ B60K 1/04
10,946,904 B2 * 3/2021 Kato ................... B62D 25/2036
(Continued)

FOREIGN PATENT DOCUMENTS

CN 206201948 5/2017
CN 206584990 10/2017
(Continued)

OTHER PUBLICATIONS

Japanese Office Action for Japanese Patent Application No. 2021-021808 mailed Aug. 15, 2023.
(Continued)

*Primary Examiner* — Kevin Hurley
*Assistant Examiner* — Hosam Shabara
(74) *Attorney, Agent, or Firm* — Amin, Turocy & Watson, LLP

(57) ABSTRACT

A vehicle body structure includes: a battery case that is disposed below a floor panel of a vehicle body and houses a battery; and a case-mounting frame that connects the battery case to a side sill provided on a side of the battery case in a vehicle width direction to support the battery case. The case-mounting frame includes a lower frame that straddles between the side sill and the battery case, and an upper frame that rises from the lower frame, supports the battery case, and is disposed side by side with the battery case in the vehicle width direction. The lower frame includes a fragile portion that is provided at a position located below the upper frame and is more fragile than another position other than the first position.

12 Claims, 9 Drawing Sheets

(51) Int. Cl.
*H01M 50/244* (2021.01)
*H01M 50/249* (2021.01)

(52) U.S. Cl.
CPC ... *H01M 50/249* (2021.01); *B60K 2001/0438* (2013.01); *H01M 2220/20* (2013.01)

(56) References Cited

U.S. PATENT DOCUMENTS

| | | | | |
|---|---|---|---|---|
| 10,967,908 | B2* | 4/2021 | Tsuyuzaki | B62D 21/157 |
| 11,370,287 | B2* | 6/2022 | Tsuyuzaki | B62D 21/157 |
| 11,691,495 | B2* | 7/2023 | Tatsuwaki | H01M 10/625 |
| | | | | 180/68.5 |
| 11,801,742 | B2* | 10/2023 | Yaita | B60L 3/0046 |
| 12,046,766 | B2* | 7/2024 | Hashimoto | B60K 1/04 |
| 2012/0161472 | A1* | 6/2012 | Rawlinson | B60R 16/04 |
| | | | | 296/187.08 |
| 2018/0236863 | A1* | 8/2018 | Kawabe | B60K 1/04 |
| 2018/0272853 | A1 | 9/2018 | Wang et al. | |
| 2019/0190096 | A1 | 6/2019 | Shen et al. | |
| 2019/0359260 | A1 | 11/2019 | Tsuyuzaki et al. | |
| 2019/0359265 | A1 | 11/2019 | Tsuyuzaki et al. | |
| 2021/0253174 | A1* | 8/2021 | Thor | B62D 25/2036 |
| 2022/0258620 | A1* | 8/2022 | Iemura | B60L 50/66 |
| 2024/0109408 | A1* | 4/2024 | Iemura | B62D 25/20 |

FOREIGN PATENT DOCUMENTS

| | | |
|---|---|---|
| CN | 110588799 | 12/2019 |
| CN | 110588802 | 12/2019 |
| JP | 3132261 | 2/2001 |
| JP | 2008-174181 | 7/2008 |
| JP | 2013-256265 | 12/2013 |
| JP | 2018-131136 | 8/2018 |
| JP | 2019-531955 | 11/2019 |

OTHER PUBLICATIONS

Chinese Office Action for Chinese Patent Application No. 202210119760.9 mailed Mar. 29, 2024.
Japanese Office Action for Japanese Patent Application No. 2021-021808 mailed Oct. 4, 2022.

* cited by examiner

VEHICLE BODY STRUCTURE

CROSS-REFERENCE TO RELATED APPLICATION

Priority is claimed on Japanese Patent Application No. 2021-021808, filed on Feb. 15, 2021, the contents of which are incorporated herein by reference.

BACKGROUND

Field of the Invention

The present invention relates to a vehicle body structure.

Background

Conventionally, a vehicle having a battery pack which is mounted below a floor panel and in which a plurality of batteries are housed side by side in a battery case (a battery pack frame) is known. In such a vehicle, various techniques have been proposed in order to reduce damage to the battery case due to a side collision with a side portion of a vehicle body in a vehicle width direction.

For example, a technique for providing an easily crushed portion on a side portion of a battery case in a vehicle width direction is disclosed. According to this, a load due to a side collision (hereinafter referred to as a side collision load) is absorbed by crushing and deforming the easily crushed portion. For example, the technique of Japanese Patent No. 3132261 is disclosed.

SUMMARY

However, in the conventional technique described above, after the easily crushed portion is completely crushed, it becomes a mere hard mass. For this reason, this mass may collide with a battery case, thereby damaging the battery case.

An aspect of the present invention provides a vehicle body structure that can reliably reduce damage to a battery case.

A vehicle body structure according to an aspect of the present invention includes: a battery case that is disposed below a floor panel of a vehicle body and houses a battery; and a case-mounting frame that connects the battery case to a side sill provided on a side of the battery case in a vehicle width direction to support the battery case, in which the case-mounting frame includes a lower frame that straddles between the side sill and the battery case, and an upper frame that rises from the lower frame, supports the battery case, and is disposed side by side with the battery case in the vehicle width direction, and the lower frame includes a fragile portion that is provided at a first position located below the upper frame and is more fragile than another position of the case-mounting frame other than the first position.

With this configuration, when a side collision load is input to the case-mounting frame via the side sill due to a side collision, the case-mounting frame is bent and deformed so that an end portion of the lower frame on the side sill side and an end portion of the upper frame on the battery case side come closer to each other. In this case, the upper frame is located above the lower frame, and thus when the end portion of the lower frame on the side sill side and the end portion of the upper frame on the battery case side are bent and deformed to come closer to each other, the fragile portion is actively crushed and deformed at the same time, and a battery case side end of the lower frame is deformed to be directed outward in the vehicle width direction. That is, the battery case side end of the lower frame is deformed to be directed outward in the vehicle width direction while being bent downward with the upper frame as a fulcrum. Along with this deformation, the fragile portion is crushed and deformed to bend upward in a convex shape. As a result, deformation such as rising of the end portion of the lower frame on the battery case side causing piercing of the battery case is prevented. A reaction force applied to the battery case is also released downward.

By deforming the case-mounting frame in this way, it is possible to secure a sufficient deformation stroke of the case-mounting frame while saving space, thereby sufficiently absorbing the side collision load. Accordingly, damage to the battery case can be reliably reduced.

In the above configuration, the upper frame may include a frame body, and at least one partition plate that is provided in the frame body and partitions the inside of the frame body into a plurality of rooms, and at least the one partition plate may be the fragile portion.

With this configuration, the battery case side of the upper frame and the battery case side of the lower frame can be more easily crushed and deformed. Since the battery case side end of the lower frame is deformed to be directed outward in the vehicle width direction while being bent downward with the upper frame as the fulcrum, the partition plate is easily crushed and deformed to bend upward in a convex shape. As a result, deformation of the battery case side end of the lower frame causing piercing of the battery case is prevented and it is deformed downward, and thus a reaction force applied to the battery case can be reliably released downward. Accordingly, damage to the battery case can be reduced more reliably.

In the above configuration, the lower frame may include a first horizontal portion that extends inward in the vehicle width direction from the side sill, a first rising portion that is bent and extends upward from an inner end of the first horizontal portion in the vehicle width direction, a second horizontal portion that extends outward in the vehicle width direction from the battery case, and a second rising portion that is bent and extends upward from an outer end of the second horizontal portion in the vehicle width direction, and the upper frame may include a frame body that straddles between an end of the first rising portion opposite the first horizontal portion and an end of the second rising portion opposite the second horizontal portion and is provided to protrude upward in a C shape in which a lower side opens.

With this configuration, the lower frame and the upper frame can be easily deformed into desired shapes. That is, the lower frame can be easily crushed and deformed to bend upward in a convex shape.

In the above configuration, the lower frame may include a side sill-fixing surface fixed to the side sill, and a case-fixing surface fixed to a bottom wall of the battery case, the upper frame may include an upper wall surface that is separate from a side surface thereof in the vehicle width direction fixed to the battery case, and the mechanical strength of a portion other than the side sill-fixing surface, the case-fixing surface, and the upper wall surface in the case-mounting frame may be lower than mechanical strengths of the side sill-fixing surface, the case-fixing surface, and the upper wall surface and may be equal to or higher than the mechanical strength of the fragile portion.

With this configuration, the case-mounting frame can be easily deformed as much as possible by the side collision load while the side sill and the battery case can be securely fixed via the case-mounting frame.

In the above configuration, each of the lower frame and the upper frame may include at least one hollow cell having a hollow shape, two side walls of the hollow cell may be the side sill-fixing surface and the upper wall surface, and a mechanical strength of a side wall other than the side sill-fixing surface and the upper wall surface of the hollow cell may be lower than the mechanical strengths of the side sill-fixing surface and the upper wall surface and may be equal to or higher than the mechanical strength of the fragile portion.

In this way, the case-mounting frame can be easily crushed and deformed by being configured by the hollow cell. In addition, the case-mounting frame can be easily deformed as much as possible by the side collision load while the side sill and the battery case can be securely fixed via the case-mounting frame with a simple structure.

In the above configuration, a plate thickness of the side wall other than the side sill-fixing surface and the upper wall surface of the hollow cell may be thinner than plate thicknesses of the side sill-fixing surface and the upper wall surface and a plate thickness of the case-fixing surface and may be equal to or thicker than a plate thickness of the fragile portion.

With this configuration, the case-mounting frame can be easily deformed as much as possible by the side collision load while the side sill and the battery case can be securely fixed via the case-mounting frame. In addition, by adjusting the plate thickness, a weight of the case-mounting frame can be reduced as much as possible.

In the above configuration, the mechanical strength of the bottom wall of the battery case may be lower than the mechanical strength of the case-fixing surface.

With this configuration, in a case in which the entire case-mounting frame presses the battery case by receiving the side collision load, the bottom wall of the battery case can be actively deformed. For this reason, it is possible to prevent the battery from being damaged.

In the above configuration, an outer impact-absorbing portion that is provided on an outer side of the upper frame in the vehicle width direction and reduces an impact of a side collision load on the vehicle body, and an inner impact-absorbing portion that is provided on an inner side of the upper frame in the vehicle width direction and reduces the impact of the side collision load on the vehicle body may be provided.

With this configuration, it is possible to sufficiently absorb the side collision load between the side sill and the battery with the case-mounting frame as a center. By using the outer impact-absorbing portion and the inner impact-absorbing portion, the case-mounting frame can be sufficiently deformed to absorb the side collision load.

In the above configuration, a portion of the lower frame outward from the upper frame in the vehicle width direction may be configured by arranging a plurality of hollow cells having a hollow shape in the vehicle width direction.

With this configuration, the lower frame can be easily deformed by the side collision load while a support strength of the battery case generated by the lower frame can be secured. That is, it is possible to secure the support strength of the lower frame and absorb the side collision load at the same time. In particular, the portion of the lower frame outward in the vehicle width direction from the upper frame is configured of the plurality of hollow cells. For this reason, the outer impact-absorbing portion can be made larger, and the inner impact-absorbing portion can be made smaller to the same extent. As a result, the battery case can be made smaller and lighter.

In the above configuration, the fragile portion may be provided on at least a lower surface of the lower frame.

With this configuration, the case-mounting frame can be easily deformed into a desired shape. That is, it is easily crushed and deformed so that the lower surface bends upward in a convex shape, and the entire lower frame is easily crushed and deformed to bend upward in a convex shape.

In the above configuration, the case-mounting frame may be integrally molded with a bottom wall of the battery case, and a refrigerant flow path through which a refrigerant flows may be formed on the bottom wall of the battery case.

With this configuration, the number of parts mounted on the vehicle body can be reduced, and manufacturing costs can also be reduced. Further, since the refrigerant flow path can be easily formed on the bottom wall of the battery case, the battery can be effectively cooled.

According to the aspect of the present invention, when a side collision occurs, it is possible to prevent deformation such as rising of the end portion of the lower frame on the battery case side causing piercing of the battery case. A reaction force applied to the battery case can also be released downward. By deforming the case-mounting frame in this way, it is possible to secure a sufficient deformation stroke of the case-mounting frame while saving space, and it is possible to sufficiently absorb the side collision load. Accordingly, damage to the battery case can be reliably reduced.

DESCRIPTION OF EMBODIMENTS

Figure 1:
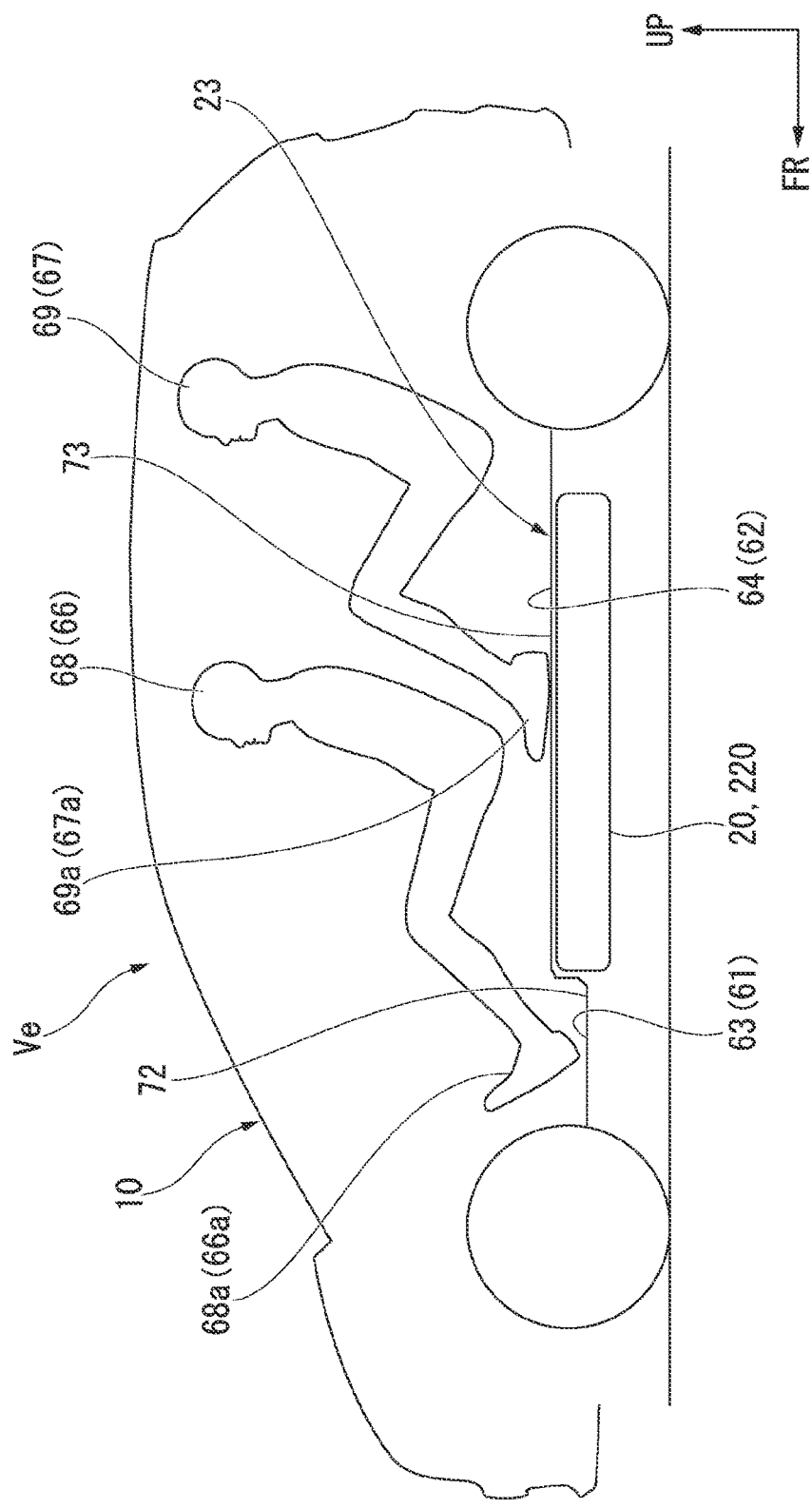
FIG. 1 is a schematic view of a battery-pack-equipped vehicle according to an embodiment of the present invention from a left side.

A battery-pack-equipped vehicle having a vehicle body structure according to an embodiment of the present invention will be described below with reference to the drawings. In the drawings, an arrow FR indicates a forward direction of the vehicle, an arrow UP indicates an upward direction of the vehicle, and an arrow LH indicates a leftward direction of the vehicle. In addition, the battery-pack-equipped vehicle has a substantially symmetrical configuration. Accordingly, the same reference numerals will be given to left and right constituent members in the following description.

<Vehicle Body>

Figure 2:
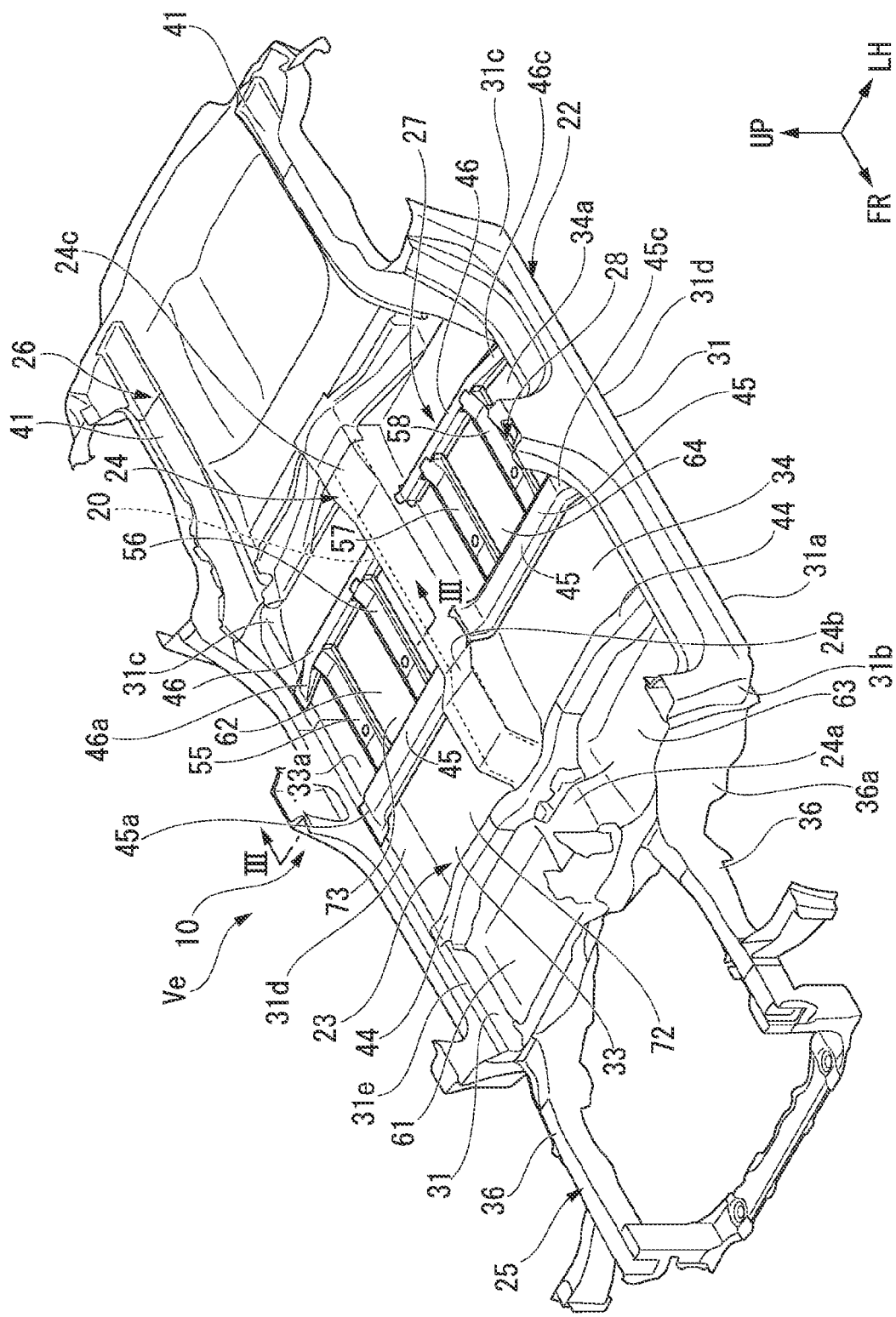
FIG. 2 is a perspective view of the battery-pack-equipped vehicle according to the embodiment of the present invention from a diagonally front side.
Figure 3:
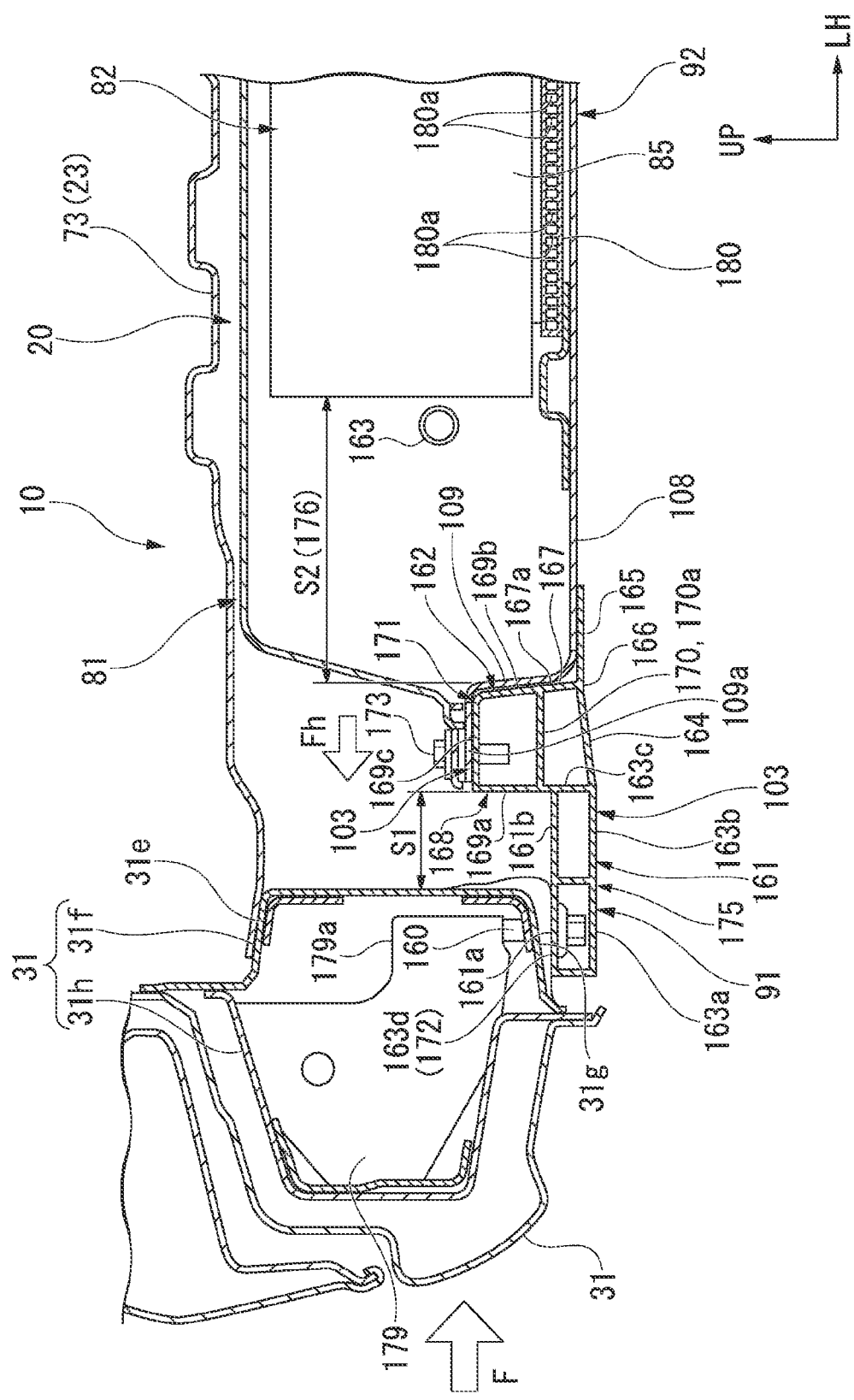
FIG. 3 is a cross-sectional view along line III-III in FIG. 2.

FIG. 1 is a schematic view of a battery-pack-equipped vehicle Ve from a left side. FIG. 2 is a perspective view of the battery-pack-equipped vehicle Ve from a diagonally front side. FIG. 3 is a cross-sectional view along line III-III in the battery-pack-equipped vehicle Ve of FIG. 2.

As shown in FIGS. 1 to 3, the battery-pack-equipped vehicle Ve includes a vehicle body 10, and a battery pack 20 disposed in a center of a lower portion of the vehicle body 10.

The vehicle body 10 includes a side sill unit 22, a floor panel 23, a floor tunnel 24, a front side frame unit 25, a rear frame unit 26, a floor cross member unit 27, and a floor longitudinal frame unit 28, <Side Sill Unit>

The side sill unit 22 includes a right side sill (a side sill) 31 and a left side sill (a side sill) 31.

The right side sill 31 forms a closed cross-section by superposing opening sides of an inner panel 31*f* and an outer panel 31*h* formed in C shapes on each other when viewed in a front to rear direction of the vehicle body. The inner panel 31*f* is disposed on an inner side in a vehicle width direction, and the outer panel 31*h* is disposed on a right outer side in the vehicle width direction. The right side sill 31 is a highly rigid member that constitutes a part of a framework of the vehicle body 10. The right side sill 31 is provided on the right outer side in the vehicle width direction and extends in the front to rear direction of the vehicle body along a right outer portion of the floor panel 23 in the vehicle width direction.

The left side sill 31 forms a closed cross-section by superposing opening sides of the inner panel 31*f* and the outer panel 31*h* formed in C shapes on each other when viewed from the front to rear direction of the vehicle body. The inner panel 31*f* is disposed on an inner side in the vehicle width direction, and the outer panel 31*h* is disposed on a left outer side in the vehicle width direction. The left side sill 31 is a highly rigid member that forms a part of the framework of the vehicle body 10. The left side sill 31 is provided on the left outer side in the vehicle width direction and extends in the front to rear direction of the vehicle body along a left outer portion of the floor panel 23 in the vehicle width direction.

Bulkheads 179 are provided in the outer panels 31*h* of each side sill 31 at locations facing left and right second floor cross members 45 and left and right third floor cross members 46 in the vehicle width direction, which will be described later.

Each bulkhead 179 is formed in a square shape to correspond to a shape of the outer panel 31*h* when viewed in the front to rear direction of the vehicle body. An extension portion 179*a* is integrally formed on an inner side of the bulkhead 179 in the vehicle width direction from substantially a center to a lower end thereof in a vertical direction. The extension portion 179*a* extends inward in the vehicle width direction to face the inner panel 31*f*.

The floor panel 23 is provided between the left side sill 31 and the right side sill 31. The floor panel 23 is a plate-shaped member having a substantially rectangular shape in plan view and forms a floor portion of the vehicle body 10. The floor panel 23 includes a first floor portion 33 and a second floor portion 34.

The first floor portion 33 is provided on a right side in the vehicle width direction between the right side sill 31 and the floor tunnel 24. The second floor portion 34 is provided on a left side in the vehicle width direction between the left side sill 31 and the floor tunnel 24.

The floor tunnel 24 extends in the front to rear direction of the vehicle body between the first floor portion 33 and the second floor portion 34.

<Front Side Frame Unit>

The front side frame unit 25 includes a right front side frame 36 and a left front side frame 36. The right front side frame 36 and the left front side frame 36 are provided forward from the battery pack 20 in the vehicle body.

The right front side frame 36 extends forward from a front portion 31*a* of the right side sill 31 in the vehicle body and is formed in substantially a V shape in plan view. The right front side frame 36 is a highly rigid member that is formed in a closed cross-section and constitutes a part of the framework of the vehicle body 10. In the right front side frame 36, a bent portion (a rear end portion of the right front side frame 36) 36*a* is connected to a front end portion 31*b* of the right side sill 31.

The left front side frame 36 extends forward from the front portion 31*a* of the left side sill 31 in the vehicle body and is formed in substantially a V shape in plan view. The left front side frame 36 is a highly rigid member that is formed in a closed cross-section and constitutes a part of the framework of the vehicle body 10. In the left front side frame 36, a bent portion (a rear end portion of the left front side frame 36) 36*a* is connected to a front end portion 31*b* of the left side sill 31.

<Rear Frame Unit>

The rear frame unit 26 includes a right rear frame 41 and a left rear frame 41. The right rear frame 41 and the left rear frame 41 are provided behind the battery pack 20 in the vehicle body.

The right rear frame 41 extends from a rear end portion 31*c* of the right side sill 31 rearward in the vehicle body and is formed in substantially a J shape in plan view. The right rear frame 41 is a highly rigid member that is formed in a closed cross-section and constitutes a part of the framework of the vehicle body 10.

The left rear frame 41 extends from a rear end portion 31*c* of the left side sill 31 rearward in the vehicle body and is formed in substantially a J shape in plan view. The left rear frame 41 is a highly rigid member that is formed in a closed cross-section and constitutes a part of the framework of the vehicle body 10.

<Floor Cross Member Unit>

The floor cross member unit 27 is disposed between the right side sill 31 and the left side sill 31 and is joined along an upper surface of the floor panel 23.

The floor cross member unit 27 includes a first right floor cross member 44, a first left floor cross member 44, a second right floor cross member (a floor cross member) 45, a second left floor cross member (a floor cross member) 45, a third right floor cross member (a floor cross member) 46, and a third left floor cross member (a floor cross member) 46.

The first right floor cross member 44 extends in the vehicle width direction in the first floor portion 33 between the vicinity of the front portion 31*a* of the right side sill 31 and a front portion 24*a* of the floor tunnel 24. The first right floor cross member 44 rises from an upper surface of the first floor portion 33 and forms a closed cross-section together with the first floor portion 33.

The first left floor cross member 44 extends in the vehicle width direction in the second floor portion 34 between the front portion 31a of the left side sill 31 and the front portion 24a of the floor tunnel 24.

The first left floor cross member 44 rises from an upper surface of the second floor portion 34 and forms a closed cross-section together with the second floor portion 34.

The second right floor cross member 45 extends in the vehicle width direction between a center 31d of the right side sill 31 and a center 24b of the floor tunnel 24. The second right floor cross member 45 rises from the upper surface of the second floor portion 34 and forms a closed cross-section together with the first floor portion 33.

The second left floor cross member 45 extends in the vehicle width direction between a center 31d of the left side sill 31 and a center 24b of the floor tunnel 24. The second left floor cross member 45 rises from the upper surface of the second floor portion 34 and forms a closed cross-section together with the second floor portion 34.

The third right floor cross member 46 extends in the vehicle width direction in the first floor portion 33 between the vicinity of the rear end portion 31c of the right side sill 31 and the vicinity of the rear end portion 24c of the floor tunnel 24. The third right floor cross member 46 rises from the upper surface of the first floor portion 33 and forms a closed cross-section together with the first floor portion 33.

The third left floor cross member 46 extends in the vehicle width direction in the second floor portion 34 between the vicinity of the rear end portion 31c of the left side sill 31 and the vicinity of the rear end portion 24c of the floor tunnel 24. The third left floor cross member 46 rises from the upper surface of the second floor portion 34 and forms a closed cross-section together with the second floor portion 34.

<Floor Longitudinal Frame Unit>

The floor longitudinal frame unit 28 includes a plurality of first to fourth floor longitudinal frames (floor frames) 55 to 58 on the floor panel 23 at intervals in the vehicle width direction. Specifically, the floor longitudinal frame unit 28 includes the first floor longitudinal frame 55 and the second floor longitudinal frame 56 provided on the first floor portion 33, and the third floor longitudinal frame 57 and the fourth floor longitudinal frame 58 provided on the second floor portion 34.

The first floor longitudinal frame 55 and the second floor longitudinal frame 56 are provided on the first floor portion 33 at intervals in the vehicle width direction and form a closed cross-section together with the first floor portion 33. Each front end portion of the first floor longitudinal frame 55 and the second floor longitudinal frame 56 is joined (coupled) to the second right floor cross member 45. Each rear end portion thereof is joined (coupled) to the third right floor cross member 46. Also, the number of floor longitudinal frames provided on the first floor portion 33 can be arbitrarily selected.

The third floor longitudinal frame 57 and the fourth floor longitudinal frame 58 are provided on the second floor portion 34 at intervals in the vehicle width direction and form a closed cross-section together with the second floor portion 34. Each front end portion of the third floor longitudinal frame 57 and the fourth floor longitudinal frame 58 is joined (coupled) to the second left floor cross member 45. Each rear end portion thereof is joined (coupled) to the third left floor cross member 46. The number of floor longitudinal frames provided on the second floor portion 34 can be arbitrarily selected.

<Floor Portion>

The first floor portion 33 has a first front footrest (a footrest) 61 and a first rear footrest (a footrest) 62.

The first front footrest 61 is disposed in a portion of the vehicle body forward from the battery pack 20. Feet 66a of an occupant 66 seated on a right front seat (not shown) are placed on the first front footrest 61. The first rear footrest 62 is disposed above the battery pack 20 and in a portion between the first floor longitudinal frame 55 and the second floor longitudinal frame 56. Feet 67a of an occupant 67 seated on a right rear seat (a seat, not shown) are placed on the first rear footrest 62.

Further, the second floor portion 34 has a second front footrest (a footrest) 63 and a second rear footrest (a footrest) 64.

The second front footrest 63 is disposed in a portion of the vehicle body forward from the battery pack 20. Feet 68a of an occupant 68 seated on a left front seat (not shown) are placed on the second front footrest 63. The second rear footrest 64 is disposed above the battery pack 20 and in a portion between the third floor longitudinal frame 57 and the fourth floor longitudinal frame 58. Feet 69a of an occupant 69 seated on a left rear seat (a seat, not shown) are placed on the second rear footrest 64.

Also, in the embodiment, an example in which the first and second front footrests 61 and 63 and the first and second rear footrests 62 and 64 are provided on the floor panel 23 has been described, but the present invention is not limited thereto. As another example, for example, either the first and second front footrests 61 and 63 or the first and second rear footrests 62 and 64 may be provided on the floor panel 23.

Further, in the floor panel 23, a front floor portion 72 is formed in a portion of the vehicle body in front of the battery pack 20, and a main floor portion 73 is formed in a portion above the battery pack 20. The front floor portion 72 has the first front footrest 61 and a second front footrest 63.

The main floor portion 73 has the first rear footrest 62 and the second rear footrest 64. The main floor portion 73 is joined to upper ends 31e of each inner panel 31f of the right side sill 31 and the left side sill 31 (a left upper end 31e is not shown).

By joining the main floor portion 73 to each upper end 31e of the right side sill 31 and the left side sill 31, a boundary between the main floor portion 73 and the right side sill 31 can be formed flat without a step in the vertical direction. Also, a boundary between the main floor portion 73 and the left side sill 31 can be formed flat without a step in the vertical direction. Thus, for example, the occupant 66 to the occupant 69 can easily get on and off the battery-pack-equipped vehicle Ve.

First Embodiment

<Battery Pack>

Figure 4:
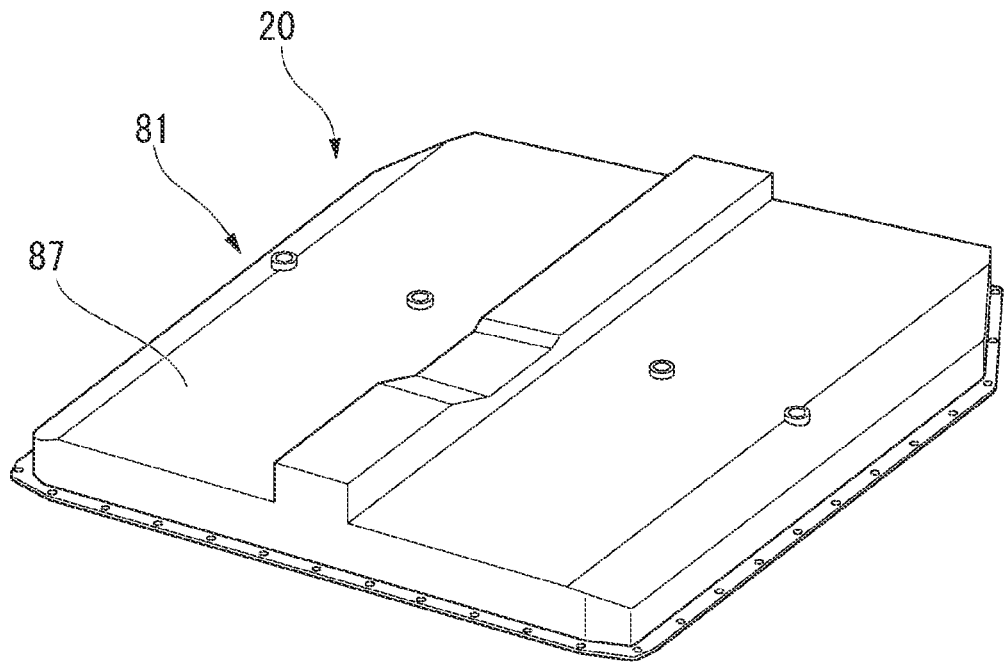
FIG. 4 is a perspective view showing a state in which a case cover is removed from a battery pack according to a first embodiment of the present invention.
Figure 4:
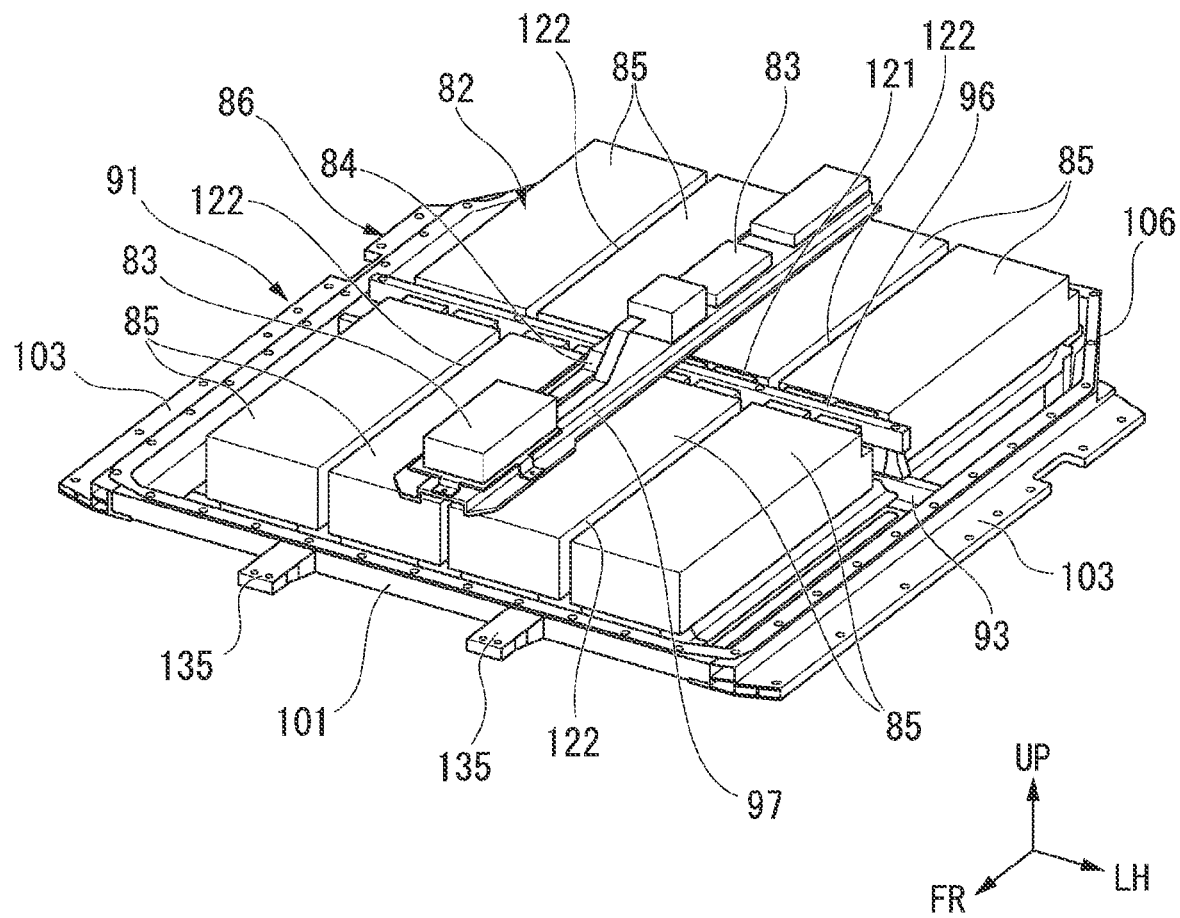
Figure 5:
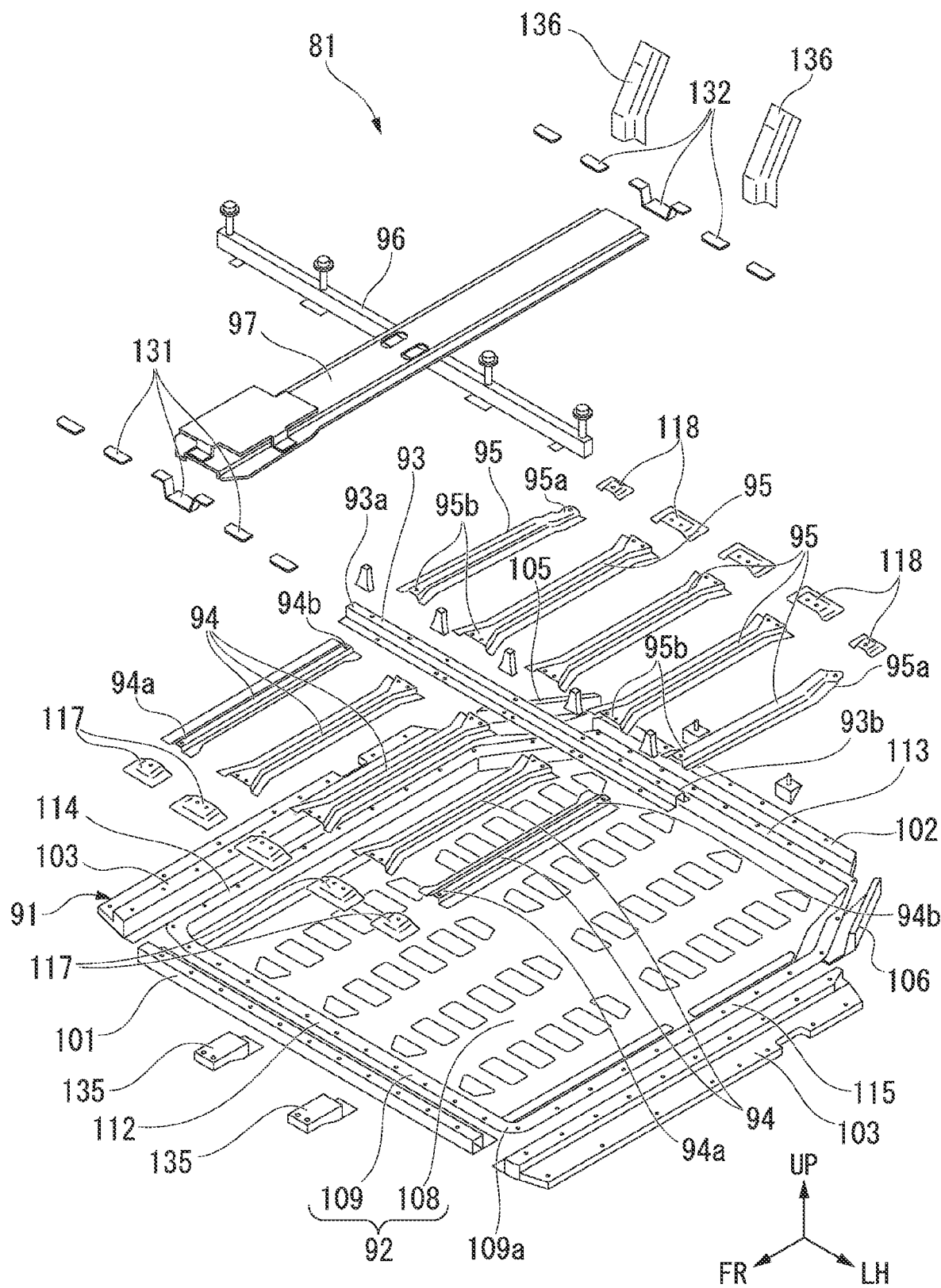
FIG. 5 is an exploded perspective view of the battery pack according to the first embodiment of the present invention.

FIG. 4 is a perspective view showing a state in which a case cover 87 is removed from the battery pack 20. FIG. 5 is an exploded perspective view of the battery pack 20.

As shown in FIGS. 3 to 5, the battery pack 20 is provided below the main floor portion 73 (that is, under the floor of the battery-pack-equipped vehicle Ve). The battery pack 20 includes a battery case 81, a case frame portion 91 provided on an outer periphery of the battery case 81, a battery module 82, a battery auxiliary device 83, and an electrical wiring 84.

<Battery Case>

The battery case 81 includes a case body 86, and a box-shaped case cover 87 with an opening on the case body 86 side that covers the case body 86 from above. The case body 86 includes a case portion 92 provided below the battery module 82, a lower cross member 93, a first longitudinal frame 94, a second longitudinal frame 95, an upper cross member 96, and an upper deck 97.

The case portion 92 has a case bottom portion (a bottom wall) 108 and a case peripheral wall 109. The case bottom portion 108 is located below the battery module 82. The case bottom portion 108 is formed in a substantially rectangular shape in plan view. The case bottom portion 108 forms a bottom portion of the battery case 81. The mechanical strength of the case bottom portion 108 is lower than the mechanical strength of a case fixing portion 165 in a case-mounting frame 103 of the case frame portion 91, which will be described later.

The case peripheral wall 109 is formed along an outer periphery of the case bottom portion 108. The case peripheral wall 109 has a case front wall 112, a case rear wall 113, a case right wall 114, and a case left wall 115. A flange portion 109a that protrudes outward is integrally formed on each wall 112 to 115. The case cover 87 is disposed to overlap the flange portion 109a.

The case frame portion 91 includes a front frame 101, a rear frame 102, a right case-mounting frame 103, a left case-mounting frame 103, a right inclined frame 105, and a left inclined frame 106. These frames 101 to 106 form a substantially rectangular frame in plan view. The case frame portion 91 is formed to cover an outer periphery of the battery module 82 with a gap therebetween.

The front frame 101 is disposed forward from a front side of the battery module 82 in the vehicle body with a gap therebetween and extends in the vehicle width direction. The rear frame 102 is disposed rearward from a rear side of the battery module 82 in the vehicle body with a gap therebetween and extends in the vehicle width direction.

<Case-Mounting Frame>

The right case-mounting frame 103 is disposed rightward from a right side of the battery module 82 in the vehicle width direction with a gap therebetween and extends rearward from a right end portion of the front frame 101 in the vehicle body. The right case-mounting frame 103 and a right end portion of the rear frame 102 are connected by the right inclined frame 105.

The left case-mounting frame 103 is disposed leftward from a left side of the battery module 82 in the vehicle width direction with a gap therebetween and extends rearward from a left end portion of the front frame 101 in the vehicle body. The left case-mounting frame 103 and a left end portion of the rear frame 102 are connected by the left inclined frame 106.

The right case-mounting frame 103 and the left case-mounting frame 103 are formed line-symmetrically with respect to a center in the vehicle width direction. For this reason, in the following description, only the right case-mounting frame 103 will be described, and description of the left case-mounting frame 103 will be omitted.

Figure 6:
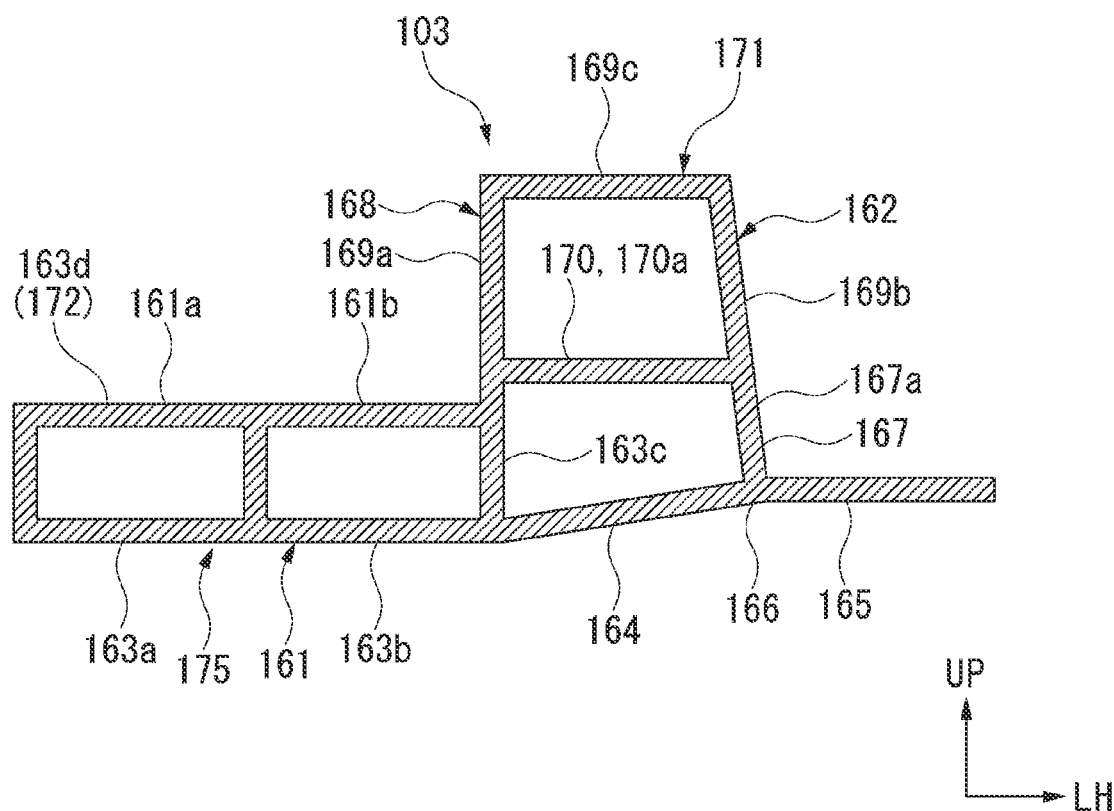
FIG. 6 is a cross-sectional view of a case-mounted frame according to the first embodiment of the present invention in a vehicle width direction and a vertical direction.

FIG. 6 is a cross-sectional view of the right case-mounting frame (hereinafter, simply referred to as a case-mounting frame) 103 in the vehicle width direction and the vertical direction.

As shown in FIGS. 3 and 6, the case-mounting frame 103 is a frame in which a lower frame 161 that extends in a horizontal direction to straddle between the side sill 31 and the battery case 81, and an upper frame 162 that rises from the lower frame 161 are integrally molded.

The lower frame 161 has two lower hollow cells 161a and 161b (a first lower hollow cell 161a and a second lower hollow cell 161b). The lower hollow cells 161a and 161b are formed in hollow square tubular shapes and extend in the front to rear direction of the vehicle body. Cross-sectional shapes of the lower hollow cells 161a and 161b in the vehicle width direction and the vertical direction are rectangular shapes elongated in the vehicle width direction.

The lower hollow cells 161a and 161b are disposed in a direction in which their longitudinal directions are in the vehicle width direction in a cross-sectional view in the vehicle width direction and the vertical direction and are disposed side by side in the vehicle width direction.

A first fragile portion 164 having a plate shape is integrally molded on a bottom wall 163b of the second lower hollow cell 161b on an inner side in the vehicle width direction of the two lower hollow cells 161a and 161b. The first fragile portion 164 extends inward in the vehicle width direction and slightly diagonally upward from the bottom wall 163b. Further, the case fixing portion 165 having a plate shape is formed to extend from an end of the first fragile portion 164 opposite the second lower hollow cell 161b to the case bottom portion 108. A rising portion 167 having a plate shape that protrudes upward from a connection portion 166 between the first fragile portion 164 and the case fixing portion 165 is integrally molded. The upper frame 162 is integrally molded to straddle between an end 167a of the rising portion 167 opposite the connection portion 166 and an inner edge of the second lower hollow cell 161b in the vehicle width direction.

The upper frame 162 has a frame body 168 having a C shape in which a lower side opens and provided to protrude upward. That is, the frame body 168 has a first upper side wall 169a that extends upward from an inner side wall 163c of the second lower hollow cell 161b on an inner side in the vehicle width direction, a second upper side wall 169b that extends upward from the rising portion 167, and an upper wall 169c (a side wall) that straddles between upper ends of these upper side walls 169a and 169b and extends in the horizontal direction.

A second fragile portion 170 having a plate shape is provided near the lower frame 161 between the first upper side wall 169a and the second upper side wall 169b. The second fragile portion 170 straddles between the first upper side wall 169a and the second upper side wall 169b and extends in the horizontal direction. That is, the second fragile portion 170 is also a partition plate 170a that is provided in the frame body 168 and partitions the inside of the frame body 168 into a plurality of rooms. Further, the frame body 168 and the second fragile portion 170 form an upper hollow cell 171 having a hollow rectangular tubular shape.

In such a configuration, the case-mounting frame 103 has a hat-shaped cross-section in the vehicle width direction and the vertical direction, and is formed by the two lower hollow cells 161a and 161b, the bottom wall 163a (a first horizontal portion) of the first lower hollow cell 161a on the outer side in the vehicle width direction, the bottom wall 163b (a first horizontal portion) of the second lower hollow cell 161b, the inner side wall 163c (a first rising portion) of the second lower hollow cell 161b, the case fixing portion 165 (a second horizontal portion), the rising portion 167 (a second rising portion), and the frame body 168 of the upper frame 162. The first fragile portion 164 is located below the upper frame 162. The first fragile portion 164 and the second fragile portion 170 are arranged at intervals in the vertical direction.

Further, in such a case-mounting frame 103, the upper wall 163d (a side wall) of the first lower hollow cell 161a becomes a side sill-fixing surface 172 fixed to the side sill 31. The side sill-fixing surface 172 is attached to a lower end 31g of the inner panel 31f in the side sill 31 from below via a fixing bolt 160. The fixing bolt 160 is screwed from below, penetrates the lower end 31g of the inner panel 31f, and protrudes into the inner panel 31f. The extension portion 179a of the bulkhead 179 is joined to a protruding portion of the fixing bolt 160.

The case bottom portion 108 of the battery case 81 is joined to the case fixing portion 165 of the case-mounting frame 103. The flange portion 109a of the battery case 81 is mounted on the upper wall 169c of the upper frame 162. The flange portion 109a is attached to the upper wall 169c by a fixing bolt 173 screwed from above the flange portion 109a to the upper wall 169c. The case peripheral wall 109 of the battery case 81 is in contact with the rising portion 167 of the lower frame 161 and the second upper side wall 169b of the upper frame 162.

Here, in the case-mounting frame 103, mechanical strengths of the case fixing portion 165, the upper wall 169c of the upper frame 162, and the side sill-fixing surface 172 are the highest mechanical strengths compared with other portions. For this reason, the battery case 81 is reliably supported by the side sill 31 via the case-mounting frame 103.

Further, in the case-mounting frame 103, the first fragile portion 164 and the second fragile portion 170 have mechanical strengths lower than other portions. In the case-mounting frame 103, mechanical strengths of other portions except the case fixing portion 165, the upper wall 169c of the upper frame 162, the side sill-fixing surface 172, the first fragile portion 164, and the second fragile portion 170 are equal to or higher than the mechanical strengths of the first fragile portion 164 and the second fragile portion 170 and lower than the mechanical strengths of the case fixing portion 165, the upper wall 169c of the upper frame 162, and the side sill-fixing surface 172.

Various methods can be exemplified as means for changing the mechanical strength. For example, there is a method of changing a plate thickness. In the case of adopting such a method, when a plate thickness of the case fixing portion 165, the upper wall 169c of the upper frame 162, and the side sill-fixing surface 172 is set to T1, a plate thickness of the first fragile portion 164 and the second fragile portion 170 is set to T2, and a plate thickness of other portions except the case fixing portion 165, the upper wall 169c of the upper frame 162, the side sill-fixing surface 172, the first fragile portion 164, and the second fragile portion 170 is set to T3, each plate thickness T1, T2, and T3 satisfies (1).

$$T1 > T3 \geq T2 \tag{1}$$

Further, as means for changing the mechanical strength, for example, a method of forming an opening in each of the fragile portions 164 and 170 or using materials having different strengths for each portion can be exemplified. Also, a size of the opening does not matter. In the present embodiment, in a case in which the opening is made as large as possible, the opening is defined as the fragile portion 164 or 170. That is, the fragile portions 164 and 170 do not have to be plate members.

Returning to FIGS. 4 and 5, the case portion 92 is provided with the lower cross member 93, a plurality of first longitudinal frames 94, and a plurality of second longitudinal frames 95.

The lower cross member 93 is disposed at a center of the case portion 92 in the front to rear direction of the vehicle body and provided to extend in the vehicle width direction. In the lower cross member 93, for example, a right end portion 93a is in contact with the case right wall 114, and a left end portion 93b is in contact with the case left wall 115.

The plurality of first longitudinal frames 94 are provided on the case bottom portion 108 forward from the lower cross member 93 in the vehicle body at intervals in the vehicle width direction. The plurality of second longitudinal frames 95 are provided on the case bottom portion 108 rearward from the lower cross member 93 in the vehicle body at intervals in the vehicle width direction.

The plurality of first longitudinal frames 94 and the plurality of second longitudinal frames 95 are disposed on the same lines at intervals in the front to rear direction of the vehicle body. The lower cross member 93 is provided between the plurality of first longitudinal frames 94 and the plurality of second longitudinal frames 95.

In the embodiment, one lower cross member 93 is exemplified, but the number of lower cross members 93 can be appropriately selected. Further, in the embodiment, five first longitudinal frames are exemplified as the plurality of first longitudinal frames 94, and five second longitudinal frames are exemplified as the plurality of second longitudinal frames 95, but the number of the first longitudinal frames 94 and the second longitudinal frames 95 can be appropriately selected.

Front end portions 94a of the first longitudinal frames 94 are attached to the front frame 101 by first mounting brackets 117 via the case bottom portion 108. Further, rear end portions 94b of the first longitudinal frame 94 are attached to the lower cross member 93.

Batteries 85 are disposed longitudinally between a pair of first longitudinal frames 94 adjacent to each other, and the batteries 85 disposed longitudinally are supported by the pair of first longitudinal frames 94.

Rear end portions 95a of the second longitudinal frames 95 are attached to the rear frame 102 by second mounting brackets 118 via the case bottom portion 108. Further, front end portions 95b of the second longitudinal frames 95 are attached to the lower cross member 93.

The batteries 85 are disposed longitudinally between a pair of second longitudinal frames 95 adjacent to each other, and the batteries 85 disposed longitudinally are supported by the pair of second longitudinal frames 95.

The battery 85 is formed in a longitudinally elongated rectangular body by stacking a plurality of battery cells (not shown) in a longitudinal direction thereof.

Also, disposing the longitudinally elongated battery 85 longitudinally means orienting the longitudinal direction of the battery 85 in the front to rear direction (longitudinal direction) of the vehicle body.

<Battery Module>

In front of the lower cross member 93 in the vehicle body, a plurality of front batteries 85 that are disposed longitudinally and form a row in the vehicle width direction are supported by the plurality of first longitudinal frames 94. Behind the lower cross member 93 in the vehicle body, a plurality of rear batteries 85 that are disposed longitudinally and form a row in the vehicle width direction are supported by the plurality of second longitudinal frames 95. The plurality of front batteries 85 constitute a front battery unit, and the plurality of rear batteries 85 constitute a rear battery unit.

Two rows of battery units of the front battery unit and the rear battery unit are disposed side by side in the front to rear direction of the vehicle body. The front battery unit (that is, the plurality of front batteries 85) and the rear battery unit (that is, the plurality of rear batteries 85) constitute, for example, a drive battery module 82.

The battery module 82 is supported by the plurality of first longitudinal frames 94 and the plurality of second longitudinal frames 95 in a state in which the plurality of batteries 85 are disposed longitudinally with their longitudinal directions directed in the front to rear direction of the vehicle body.

In the embodiment, an example in which the plurality of front batteries 85 and the plurality of rear batteries 85 are disposed in pairs in the front to rear direction of the vehicle body has been described, but the present invention is not limited thereto. As another example, the plurality of front batteries 85 and the plurality of rear batteries 85 may be disposed in three or more rows in the front to rear direction of the vehicle body.

The battery module 82 has a first boundary portion 121 extending in the vehicle width direction and second boundary portions 122 extending in the front to rear direction of the vehicle body (a second boundary portion 122 at a center in the vehicle width direction is not shown) set between respective rows of the batteries 85 among the plurality of batteries 85. The first boundary portion 121 extends in the vehicle width direction along the lower cross member 93. In other words, the lower cross member 93 is provided between respective rows of the batteries 85. The second boundary portions 122 extend in the front to rear direction of the vehicle body along the first longitudinal frames 94 and the second longitudinal frames 95.

The upper cross member 96 is disposed above the battery module 82 at a position corresponding to the first boundary portion 121. In other words, the upper cross member 96 is provided between respective rows of the batteries 85.

The upper cross member 96 is provided along the lower cross member 93. A length of the upper cross member 96 in the vehicle width direction is shorter than a length of the lower cross member 93 in the vehicle width direction. For this reason, the lower cross member 93 protrudes outward in the vehicle width direction from the upper cross member 96. The upper cross member 96 is coupled to the lower cross member 93 via an attachment bolt (not shown). In addition, the plurality of batteries 85 are fixed from above by the upper cross member 96. Further, the lower cross member 93, the upper cross member 96, and the first to fourth floor longitudinal frames 55 to 58 are connected to each other in the vertical direction via attachment bolts (not shown).

<Battery Auxiliary Devices>

Above the plurality of batteries 85, the upper deck 97 is provided in the second boundary portion 122 (not shown) at the center in the vehicle width direction among the plurality of second boundary portions 122. The upper deck 97 is provided with battery auxiliary devices 83 such as a high-voltage junction board and an electronic control unit (ECU or a control device).

A high-voltage junction box is, for example, an auxiliary device that supplies electricity of the drive battery module 82 to a drive motor (not shown). The ECU is, for example, a battery management unit that controls discharging and charging between the drive battery module 82 and the drive motor.

<Electrical Wiring>

The electrical wiring 84 is disposed in a space of the first boundary portion 121 of the battery module 82 and a space of the second boundary portion 122 at the center in the vehicle width direction.

In the embodiment, an example in which the electrical wiring 84 is disposed in the space of the first boundary portion 121 and the space of the second boundary portion 122 will be described, but the present invention is not limited thereto. As another example, the electrical wiring 84 may be disposed in one of the space of the first boundary portion 121 and the space of the second boundary portion 122.

The case cover 87 is attached to the case frame portion 91 from above in a state in which the battery module 82, the battery auxiliary devices 83, and the electrical wiring 84 are housed in the case body 86. Thus, the battery pack 20 is assembled and attached below the floor of the battery-pack-equipped vehicle Ve.

Further, the second left and right floor cross members 45 are provided forward from the first boundary portion 121 in the vehicle body. The third left and right floor cross members 46 are provided rearward from the first boundary portion 121 in the vehicle body.

In such a configuration, the front frame 101 of the case body 86 is connected to a lower side of the main floor portion 73 (below the floor of the battery-pack-equipped vehicle Ve) via a pair of front support brackets 135. The rear frame 102 of the case body 86 is connected to a lower side of the main floor portion 73 via a pair of rear support brackets 136.

Left and right flanges of the first to fourth floor longitudinal frames 55 to 58 are joined to the floor panel 23. For this reason, the battery pack 20 is fixed to the first to fourth floor longitudinal frames 55 to 58 via the floor panel 23.

A right front support bracket 135 is coupled to the second first longitudinal frames 94 of the plurality of first longitudinal frames 94 from a right outer side inward in the vehicle width direction via the front frame 101. The right front support bracket 135 is coupled to a lower side of the main floor portion 73.

Further, a left front support bracket 135 is coupled to the second first longitudinal frames 94 of the plurality of first longitudinal frames 94 from a left outer side inward in the vehicle width direction via the front frame 101. The left front support bracket 135 is coupled to a lower side of the main floor portion 73.

As shown in FIG. 3, a water jacket 180 is provided between the batteries 85 provided in this way and the case bottom portion 108 of the case portion 92. The water jacket 180 is for cooling the batteries 85 and has a plurality of refrigerant flow paths 180a therein. The batteries 85 are continuously cooled by flowing a refrigerant through the refrigerant flow paths 180a.

<Action of Vehicle Body when Side Collision Occurs>

Next, on the basis of FIGS. 3 and 6 to 8, an action of the vehicle body 10 when a side collision load F is input to a side portion of the vehicle body 10 due to, for example, a side collision will be described.

As shown in FIG. 3, the side collision load F input to the vehicle body 10 is transmitted to the case-mounting frame 103 via the side sill 31 and the bulkhead 179 in the side sill 31. More specifically, in the case-mounting frame 103, the side collision load F inward in the vehicle width direction is input to the first lower hollow cell 161a fixed to the side sill 31. At the same time, due to the side collision load F being transmitted to the case portion 92 via the case-mounting frame 103, a reaction force Fh outward in the vehicle width direction is generated in the case portion 92.

Figure 7:
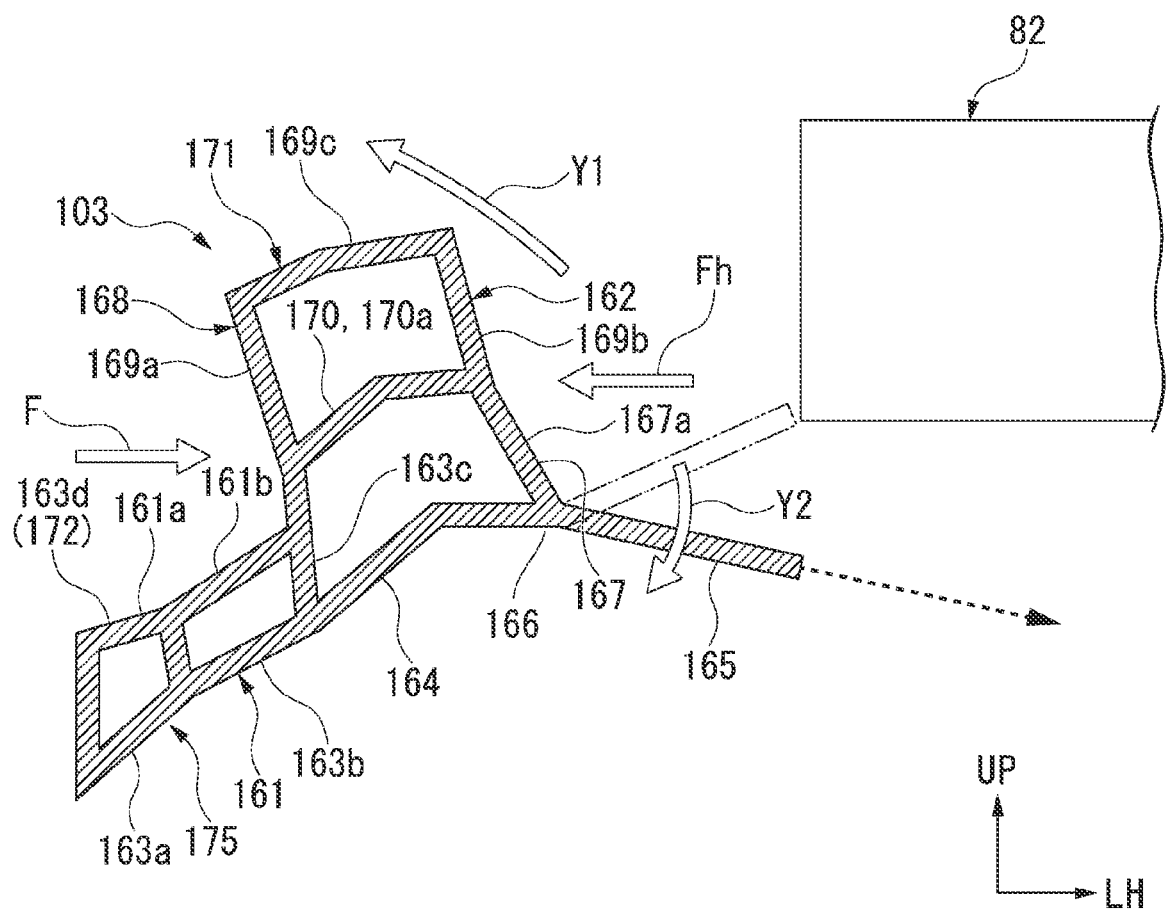
FIG. 7 is an explanatory diagram showing behavior progress of the case-mounted frame when a side collision load is input in the first embodiment of the present invention.

FIG. 7 is an explanatory diagram showing a behavior progress of the case-mounting frame 103 when the side collision load F is input.

Here, in the case-mounting frame 103, the upper frame 162 on which the case peripheral wall 109 and the flange portion 109a of the battery case 81 are supported is located above the lower frame 161 to which the side collision load F is input.

For this reason, as shown in FIG. 7, the upper wall 169c of the upper frame 162 is deformed to come closer to the side sill 31 by receiving the reaction force Fh (see arrow Y1 in FIG. 7). At the same time, the rising portion 167 and the second upper side wall 169b receive the reaction force Fh and tend to deform outward in the vehicle width direction.

In this case, in the case-mounting frame 103, the first fragile portion 164 and the second fragile portion 170 have lower mechanical strengths than other portions, and thus they are actively crushed and deformed. More specifically, due to the above deformation of the upper wall 169c, the rising portion 167, and the second upper side wall 169b of the upper frame 162, the first fragile portion 164 and the second fragile portion 170 are crushed and deformed to bend upward in a convex shape. Further, with the deformation of the first fragile portion 164, the rising portion 167 and the second upper side wall 169b are deformed outward in the vehicle width direction while being bent downward with the upper wall 169c as a fulcrum (see arrow Y2 in FIG. 7). As a result, the case fixing portion 165 is deformed to be inclined downward. In other words, deformation such as rising of the case fixing portion 165 causing piercing of the battery case 81 is prevented. In addition, the reaction force Fh of the battery case 81 is also released downward.

The case-mounting frame 103 has a hat-shaped cross-section in the vehicle width direction and the vertical direction, and is formed by the two lower hollow cells 161a and 161b, the bottom wall 163a of the first lower hollow cell 161a outward in the vehicle width direction, the bottom wall 163b of the second lower hollow cell 161b, the inner side wall 163c of the second lower hollow cell 161b, the case fixing portion 165, the rising portion 167, and the frame body 168 of the upper frame 162. Inside such a structure, the first fragile portion 164 is provided below the upper frame 162. For this reason, when the reaction force Fh of the battery case 81 is input to the rising portion 167 and the second upper side wall 169b due to the load (side collision load F) in the vehicle width direction, the fragile portions 164 and 170 are easily affected by the reaction force Fh. Accordingly, each of the fragile portions 164 and 170 is easily crushed and deformed.

Figure 8:
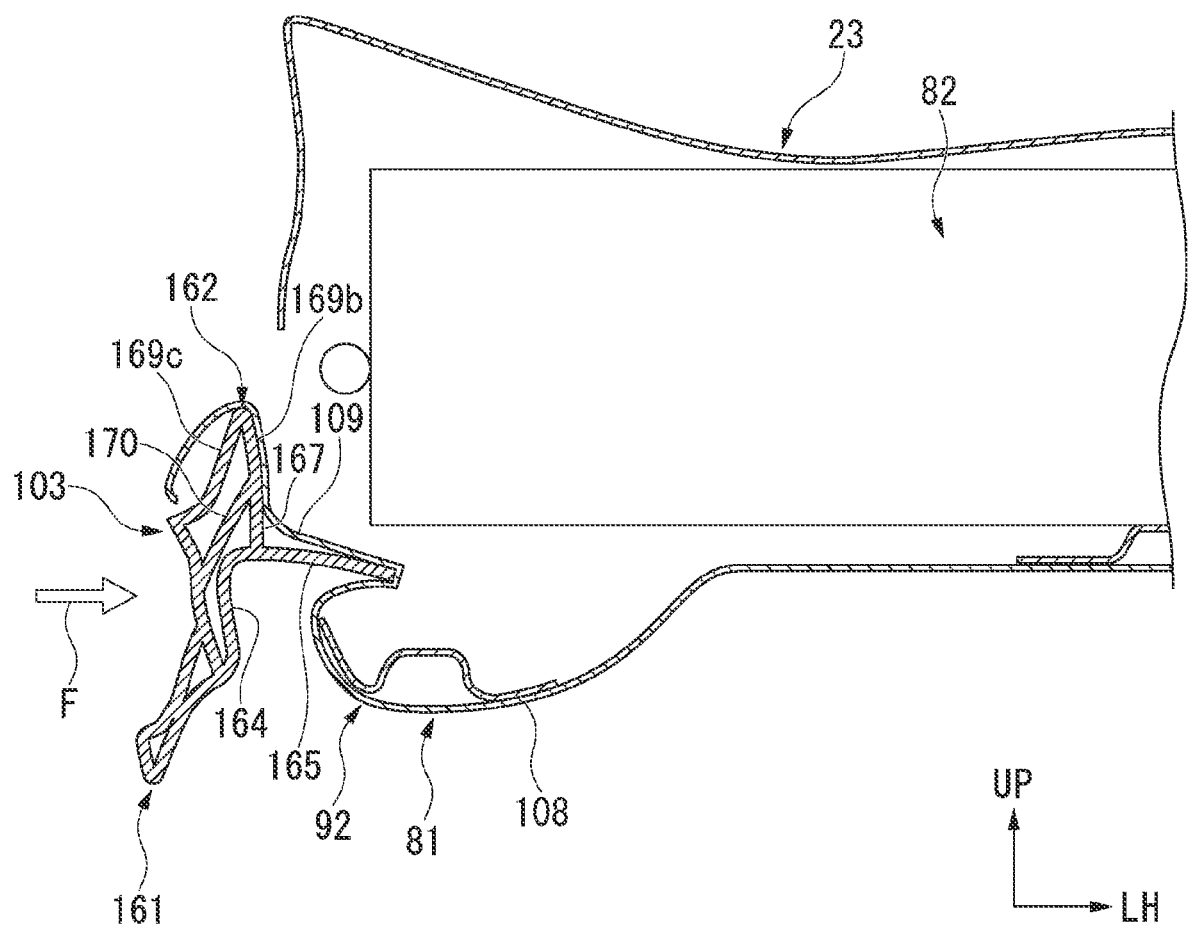
FIG. 8 is an explanatory diagram showing a final deformation state of the case-mounted frame and a bottom portion of the case when the side collision load is input in the first embodiment of the present invention.

FIG. 8 is an explanatory diagram showing a final deformation state of the case bottom portion 108 of the case-mounting frame 103 and the case portion 92 when the side collision load F is input.

Further, the mechanical strength of the case bottom portion 108 that forms the bottom portion of the battery case 81 is lower than the mechanical strength of the case fixing portion 165 in the case-mounting frame 103.

For this reason, as shown in FIG. 8, when the side collision load F is further input, the case bottom portion 108 is deformed to slip under the case fixing portion 165 before the case fixing portion 165 is deformed.

This deformation causes a situation in which the side collision load F and the reaction force Fh are absorbed, and transmission of the side collision load F to the battery module 82 is reduced as much as possible.

Incidentally, as shown in FIG. 3, in the case-mounting frame 103, the first lower hollow cell 161a is attached to the lower end 31g of the side sill 31, and thus a first space S1 is formed between the upper frame 162, which is provided inward from the first lower hollow cell 161a in the vehicle width direction, and the side sill 31. The lower frame 161 disposed in the first space S1 is formed by arranging the two lower hollow cells 161a and 161b (the first lower hollow cell 161a and the second lower hollow cell 161b) in the vehicle width direction, and thus it is easily deformed when the side collision load F is input while ensuring sufficient strength. That is, the two lower hollow cells 161a and 161b function as an outer impact-absorbing portion 175 (see FIG. 6) that is provided outward from the upper frame 162 in the vehicle width direction and reduces the input of the side collision load F to the upper frame 162. In addition, the first space S1 is a space for allowing deformation of the two lower hollow cells 161a and 161b, and as a result, functions as the outer impact-absorbing portion 175.

Further, since the batteries 85 are disposed longitudinally, a second space S2 between the upper frame 162 and the battery module 82 can be secured as large as possible. The second space S2 is a space for allowing deformation of the case fixing portion 165 of the lower frame 161 and the battery case 81. That is, the second space S2 is provided inward from the upper frame 162 in the vehicle width direction and functions as an inner impact-absorbing portion 176 that reduces an impact of the side collision load F.

As described above, the above-mentioned case-mounting frame 103 is configured of the lower frame 161 that straddles between the side sill 31 and the battery case 81, and the upper frame 162 that rises from the lower frame 161. The lower frame 161 is provided with the first fragile portion 164 below the upper frame 162. For this reason, the first fragile portion 164 is crushed and deformed to bend upward in a convex shape. As a result, it is possible to prevent the case fixing portion 165 of the case-mounting frame 103 from becoming deformed and rising and piercing the battery case 81. Further, the case-mounting frame 103 can release the reaction force Fh of the battery case 81 downward. By deforming the case-mounting frame 103 in this way, it is possible to sufficiently secure a deformation stroke of the case-mounting frame 103 while saving space, and it is possible to sufficiently absorb the side collision load F.

Accordingly, damage to the battery case 81 can be reliably reduced.

The upper frame 162 is provided with the second fragile portion 170 aligned with the first fragile portion 164 in the vertical direction. For this reason, the second upper side wall 169b and the rising portion 167 of the case-mounting frame 103 can be more easily crushed and deformed. Since the second upper side wall 169b and the rising portion 167 are pressed outward in the vehicle width direction with the upper wall 169c as a fulcrum, the second fragile portion 170 is also crushed and deformed to bend upward in a convex shape. For this reason, it is possible to more reliably prevent the case fixing portion 165 of the case-mounting frame 103 from becoming deformed and rising and causing piercing of the battery case 81. Further, the case-mounting frame 103 can reliably release the reaction force Fh of the battery case 81 downward.

The case-mounting frame 103 has a hat-shaped cross-section in the vehicle width direction and the vertical direction, and is formed by the two lower hollow cells 161a and 161b, the bottom wall 163a of the first lower hollow cell 161a outward in the vehicle width direction, the bottom wall 163b of the second lower hollow cell 161b, the inner side wall 163c of the second lower hollow cell 161b, the case fixing portion 165, the rising portion 167, and the frame body 168 of the upper frame 162. Inside such a structure, the first fragile portion 164 is provided below the upper frame 162, and thus each of the fragile portions 164 and 170 can be more reliably crushed and deformed to bend upward in a convex shape due to the load (side collision load F) in the vehicle width direction.

The case-mounting frame 103 has the case fixing portion 165, the upper wall 169c of the upper frame 162, and the side sill-fixing surface 172. The mechanical strengths of the case fixing portion 165, the upper wall 169c of the upper frame 162, and the side sill-fixing surface 172 are the highest mechanical strengths compared with other portions. In addition, the first fragile portion 164 and the second fragile portion 170 have lower mechanical strengths than other portions. Further, the mechanical strengths of other portions except the case fixing portion 165, the upper wall 169c of the upper frame 162, the side sill-fixing surface 172, the first fragile portion 164, and the second fragile portion 170 are equal to or higher than the mechanical strengths of the first fragile portion 164 and the second fragile portion 170 and lower than the mechanical strengths of the case fixing portion 165, the upper wall 169c of the upper frame 162, and the side sill-fixing surface 172. For this reason, the battery case 81 can be reliably supported by the side sill 31 via the case-mounting frame 103, and the case-mounting frame 103 can be easily deformed as much as possible by the side collision load F.

A part of the lower frame 161 of the case-mounting frame 103 is configured of the two lower hollow cells 161a and 161b. The upper frame 162 is also configured of the upper hollow cell 171. In this way, by forming the case-mounting frame 103 with the hollow cells 161a, 161b, and 171, the case-mounting frame 103 can be easily crushed and deformed. In addition, the case-mounting frame 103 can be easily deformed as much as possible by the side collision load F while securely fixing the side sill 31 and the battery case 81 via the case-mounting frame 103 with a simple structure.

As means for changing the mechanical strength of each portion of the case-mounting frame 103, for example, the plate thicknesses T1 of the case fixing portion 165, the upper wall 169c of the upper frame 162, and the side sill-fixing surface 172, the plate thicknesses T2 of the first fragile portion 164 and the second fragile portion 170, and the plate thicknesses T3 of other portions except the case fixing portion 165, the upper wall 169c of the upper frame 162, the side sill-fixing surface 172, the first fragile portion 164, and the second fragile portion 170 are set to satisfy the above equation (1). For this reason, the case-mounting frame 103 can be easily deformed as much as possible by the side collision load F while securely fixing the side sill 31 and the battery case 81 via the case-mounting frame 103. In addition, by adjusting the plate thicknesses T1 to T3, a weight of the case-mounting frame 103 can be reduced as much as possible.

The mechanical strength of the case bottom portion 108 that forms the bottom portion of the battery case 81 is lower than the mechanical strength of the case fixing portion 165 in the case-mounting frame 103. For this reason, when the side collision load F is input, the case bottom portion 108 is deformed to slip under the case fixing portion 165 before the case fixing portion 165 is deformed. In this way, in a case in which the entire case-mounting frame 103 presses the battery case 81 by receiving the side collision load F, the case bottom portion 108 of the battery case 81 is actively deformed so that damage to the batteries 85 can be prevented.

The two lower hollow cells 161a and 161b are disposed side by side in the vehicle width direction outward from the upper frame 162 in the vehicle width direction. These lower hollow cells 161a and 161b function as the outer impact-absorbing portion 175 (see FIG. 6) that is provided outward from the upper frame 162 in the vehicle width direction and reduces the input of the side collision load F to the upper frame 162. In addition, the first space S1 is a space for allowing deformation of the two lower hollow cells 161a and 161b, and as a result, functions as the outer impact-absorbing portion 175. For this reason, the side collision load F can be sufficiently absorbed between the side sill 31 and the battery module 82 centering on the case-mounting frame 103.

Further, the second space S2 between the upper frame 162 and the battery module 82 is caused to function as the inner impact-absorbing portion 176 that allows deformation of the case fixing portion 165 and the battery case 81 of the lower frame 161 and reduces the impact of the side collision load F. For this reason, damage to the battery module 82 due to the side collision load F can be reliably prevented. For example, when the battery case 81 is deformed by the side collision load F, it is possible to prevent a water-cooled pipe 163 and the like from being crushed by the deformed battery case 81.

The lower frame 161 is configured by arranging the two lower hollow cells 161a and 161b in the vehicle width direction. For this reason, the lower frame 161 can be easily deformed by the side collision load F while ensuring the support strength of the battery case 81 provided by the lower frame 161. That is, it is possible to secure the support strength of the lower frame 161 and to absorb the side collision load F at the same time. In particular, by forming a portion of the lower frame 161 outward from the upper frame 162 in the vehicle width direction with the plurality of lower hollow cells 161a and 161b, the outer impact-absorbing portion 175 can be made larger, and the inner impact-absorbing portion 176 can be made smaller to the same extent. As a result, the battery case 81 can be made smaller and lighter.

Second Embodiment

<Battery Pack>

Next, a second embodiment will be described with reference to FIG. 1 and on the basis of FIG. 9.

Figure 9:
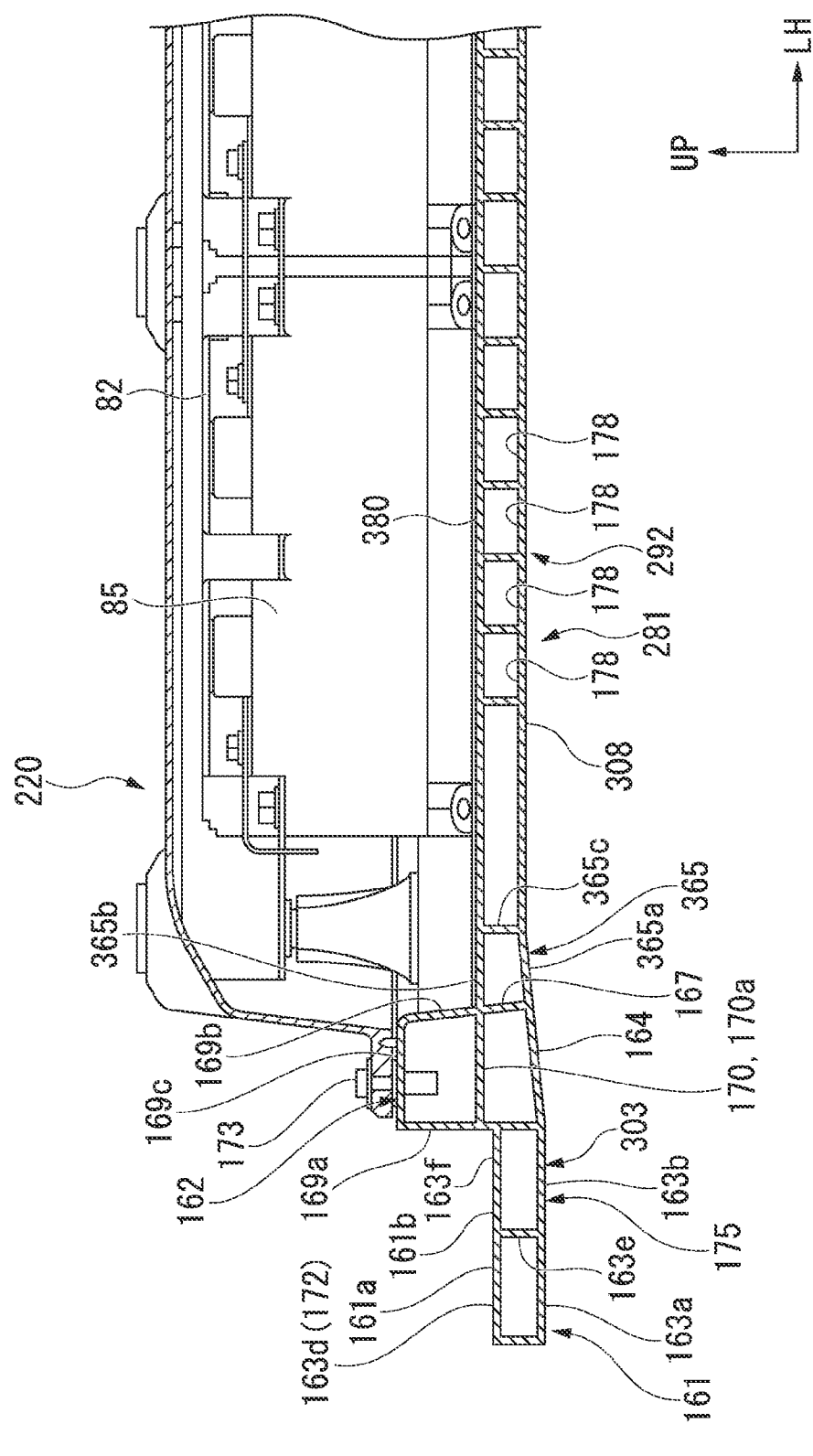
FIG. 9 is a cross-sectional view of a battery pack according to a second embodiment of the present invention in the vehicle width direction and the vertical direction.

FIG. 9 is a cross-sectional view of a battery pack 220 according to the second embodiment in the vehicle width direction and the vertical direction. FIG. 9 corresponds to FIG. 3 described above. Also, in the second embodiment, the same reference numerals and the same names as those in the first embodiment will be given and description thereof will be omitted.

As shown in FIGS. 1 and 9, the second embodiment is the same as the first embodiment described above in that the battery pack 220 is disposed at the center of the lower portion of the vehicle body 10, and includes a battery case 281, a case frame portion 291 provided on an outer periphery of the battery case 281, a battery module 82, and the like. This is the same as the first embodiment described above for the case frame portion 291 to include front and rear frames (neither shown in the second embodiment), right and left case-mounting frames 303, and right and left inclined frames (neither shown in the second embodiment).

Here, a difference between the above-mentioned first embodiment and the second embodiment is that the case-mounting frame 303 and the battery case 281 are separate bodies in the first embodiment, whereas the case-mounting frame 303 and a case portion 292 of the battery case 281 are integrally molded in the second embodiment.

<Battery Case and Case-Mounting Frame>

As shown in FIG. 9, the case-mounting frame 303 and the case portion 292 are formed by extrusion molding.

A case fixing portion 365 (a second horizontal portion) of the case-mounting frame 303 has a bottom wall 365a that extends slightly diagonally upward from the first fragile portion 164 inward in the vehicle width direction, a horizontal wall 365b that extends inward in the vehicle width direction from the second fragile portion 170, and an end wall 365c that straddles between inner ends of the bottom wall 365a and the horizontal wall 365b in the vehicle width direction. The bottom wall 365a, horizontal wall 365b, and end wall 365c form a hollow cell having a hollow rectangular tubular shape that extends in the front to rear direction of the vehicle body.

A case bottom portion 308 (a bottom wall) of the case portion 292 is connected to the case fixing portion 365. A plurality of refrigerant flow paths 178 that extend in the front to rear direction of the vehicle body are formed on the case bottom portion 308. The plurality of refrigerant flow paths 178 are disposed side by side in the vehicle width direction.

In such a configuration, the case-mounting frame 303 and the case portion 292 are formed by extrusion molding such that the front to rear direction of the vehicle body (a front to back direction of the paper surface) becomes an extrusion direction. The plurality of refrigerant flow paths 178 that open in the front to rear direction of the vehicle body in the case bottom portion 308 are blocked by the front frame 101 and the rear frame 102 (not shown in FIG. 9, see FIG. 5).

Although detailed illustration of the front frame 101 and the rear frame 102 is omitted, the frames 101 and 102 are formed such that predetermined refrigerant flow paths 178 adjacent to each other in the vehicle width direction communicate with each other in the frames 101 and 102. Thus, the plurality of refrigerant flow paths 178 are provided to meander directly under the battery 85. A refrigerant flows in the refrigerant flow paths 178.

That is, the case bottom portion 308 functions as a water jacket 380 for cooling the battery 85.

Therefore, according to the above-mentioned second embodiment, the same effects as those of the above-mentioned first embodiment are achieved. In addition to this, since the case-mounting frame 303 and the case portion 292 of the battery case 281 are integrally molded, the number of components can be reduced and manufacturing costs can be reduced.

By forming the refrigerant flow paths 178 in the case bottom portion 308, it is not necessary to prepare a separate water jacket. For this reason, the number of components can be further reduced while effectively cooling the battery 85.

Also, in the second embodiment described above, the case in which the case-mounting frame 303 and the case portion 292 are formed by extrusion molding has been described. However, the present invention is not limited thereto, and the case-mounting frame 303 and the case portion 292 may be integrally molded. For example, the case-mounting frame 303 and the case portion 292 may be formed by die casting (a mold) or the like.

The technical scope of the present invention is not limited to the above-described embodiments, and various changes can be made without departing from the scope of the present invention.

For example, in the above-described embodiments, the case in which the second fragile portion 170 is provided in the upper frame 162 of the case-mounting frame 103 or 303 has been described. However, the present invention is not limited thereto, and the second fragile portion 170 may not be provided. Instead of the second fragile portion 170, a partition plate having a higher mechanical strength than the second fragile portion 170 may be provided.

Further, a plurality of partition plates 170a may be provided side by side in the vertical direction. The upper frame 162 may be configured of a plurality of upper hollow cells 171 due to the plurality of partition plates 170a. At least one of the plurality of partition plates 170a may be used as the second fragile portion 170.

In the above-described embodiments, the case in which the two lower hollow cells 161a and 161b are disposed side by side in the vehicle width direction in the lower frame 161 outward from the upper frame 162 in the vehicle width direction has been described. However, the present invention is not limited thereto, and the lower frame 161 may be configured of a plurality of three or more hollow cells. In addition to arranging the plurality of hollow cells in the vehicle width direction, they may be arranged in the vertical direction.

In the above-described embodiments, the case in which the first fragile portion 164 is integrally molded at a position of the lower frame 161 located below the upper frame 162 has been described. Further, as means for changing the mechanical strength of each portion of the case-mounting frame 103, for example, the case in which the plate thicknesses T1 of the case fixing portion 165, the upper wall 169c of the upper frame 162, and the side sill-fixing surface 172, the plate thicknesses T2 of the first fragile portion 164 and the second fragile portion 170, and the plate thicknesses T3 of other portions except the case fixing portion 165, the upper wall 169c of the upper frame 162, the side sill-fixing surface 172, the first fragile portion 164, and the second fragile portion 170 are set to satisfy the above equation (1) has been described. However, the present invention is not limited thereto, and a fragile portion may be provided at least on a lower surface of the lower frame 161 including a portion of the lower frame 161 located below the upper frame 162. For example, in the case-mounting frames 103 and 303, the bottom walls 163a and 163b of the lower hollow cells 161a and 161b may be fragile portions having lower mechanical strengths than other portions. With this configuration, the case-mounting frames 103 and 303 can be easily deformed into desired shapes. That is, the lower surface (the bottom walls 163a and 163b, and the first fragile portion 164) is likely to be bent and deformed to be upwardly convex, and the entire lower frame 161 is likely to be bent and deformed to be upwardly convex.

In addition, it is appropriately possible to replace constituent elements in the above-described embodiments with well-known constituent elements without departing from the scope of the present invention, and the above-mentioned modified examples may be appropriately combined.

What is claimed is:

1. A vehicle body structure, comprising:
    a battery case that is disposed below a floor panel of a vehicle body and houses a battery; and
    a case-mounting frame that connects the battery case to a side sill provided on a side of the battery case in a vehicle width direction to support the battery case,
    wherein the case-mounting frame comprises
        a lower frame that straddles between the side sill and the battery case, and
        an upper frame that rises from the lower frame, supports the battery case, and is disposed side by side with the battery case in the vehicle width direction,
    the lower frame includes a fragile portion that is provided at a first position located below the upper frame and is more fragile than another position of the case-mounting frame other than the first position, the lower frame includes:
- a first horizontal portion that extends inward in the vehicle width direction from the side sill;
- a first rising portion that is bent and extends upward from an inner end of the first horizontal portion in the vehicle width direction;
- a second horizontal portion that extends outward in the vehicle width direction from the battery case; and
- a second rising portion that is bent and extends upward from an outer end of the second horizontal portion in the vehicle width direction, and the upper frame includes a frame body that straddles between an end of the first rising portion opposite the first horizontal portion and an end of the second rising portion opposite the second horizontal portion and is provided to protrude upward in a C shape in which a lower side opens.

2. The vehicle body structure according to claim 1, wherein the upper frame includes
- a frame body, and
- at least one partition plate that is provided in the frame body and partitions an inside of the frame body into a plurality of rooms, and at least the one partition plate is the fragile portion.

3. The vehicle body structure according to claim 1, wherein the lower frame includes
- a side sill-fixing surface fixed to the side sill, and
- a case-fixing surface fixed to a bottom wall of the battery case, the upper frame includes an upper wall surface that is separate from a side surface thereof in the vehicle width direction fixed to the battery case, and a mechanical strength of a portion other than the side sill-fixing surface, the case-fixing surface, and the upper wall surface in the case-mounting frame is lower than mechanical strengths of the side sill-fixing surface, the case-fixing surface, and the upper wall surface and is equal to or higher than a mechanical strength of the fragile portion.

4. The vehicle body structure according to claim 3, wherein each of the lower frame and the upper frame includes at least one hollow cell having a hollow shape, two side walls of the hollow cell are the side sill-fixing surface and the upper wall surface, and a mechanical strength of a side wall other than the side sill-fixing surface and the upper wall surface of the hollow cell is lower than the mechanical strengths of the side sill-fixing surface and the upper wall surface and is equal to or higher than the mechanical strength of the fragile portion.

5. The vehicle body structure according to claim 4, wherein a plate thickness of the side wall other than the side sill-fixing surface and the upper wall surface of the hollow cell is thinner than plate thicknesses of the side sill-fixing surface and the upper wall surface and a plate thickness of the case-fixing surface and is equal to or thicker than a plate thickness of the fragile portion.

6. The vehicle body structure according to claim 3, wherein a mechanical strength of the bottom wall of the battery case is lower than the mechanical strength of the case-fixing surface.

7. The vehicle body structure according to claim 1, further comprising:
- an outer impact-absorbing portion that is provided on an outer side of the upper frame in the vehicle width direction and reduces an impact of a side collision load on the vehicle body; and
- an inner impact-absorbing portion that is provided on an inner side of the upper frame in the vehicle width direction and reduces the impact of the side collision load on the vehicle body.

8. The vehicle body structure according to claim 1, wherein a portion of the lower frame outward from the upper frame in the vehicle width direction is configured by arranging a plurality of hollow cells having a hollow shape in the vehicle width direction.

9. The vehicle body structure according to claim 8, wherein the fragile portion is provided on at least a lower surface of the lower frame.

10. The vehicle body structure according to claim 1, wherein the case-mounting frame is integrally molded with a bottom wall of the battery case, and a refrigerant flow path through which a refrigerant flows is formed on the bottom wall of the battery case.

11. The vehicle body structure according to claim 1, wherein a first fragile portion that extends inward in the vehicle width direction from the first horizontal portion and constitutes the fragile portion is integrally molded on the lower frame.

12. The vehicle body structure according to claim 11, wherein the upper frame has a second fragile portion that straddles between the first rising portion and the second rising portion, extends in a horizontal direction, and constitutes the fragile portion.

* * * * *